United States Patent

[11] 3,559,782

[72] Inventors Hubert G. Lesley, deceased, late of Clayton, Ga., by Kathryn W. Lesley, executrix, Clayton, Ga.
[21] Appl. No. 729,484
[22] Filed Apr. 22, 1968
[45] Patented Feb. 2, 1971

[54] CONVEYOR ROLLER AND METHOD OF MANUFACTURING SAME
9 Claims, 9 Drawing Figs.

[52] U.S. Cl. ................................................. 193/37
[51] Int. Cl. ................................................. B65g 13/00
[50] Field of Search ........................................ 193/37;
198/127; 29/116, 122

[56] References Cited
UNITED STATES PATENTS
| | | | |
|---|---|---|---|
| 1,748,473 | 2/1930 | Fisk | 193/37 |
| 1,990,806 | 2/1935 | Watson et al. | 193/37 |
| 2,528,116 | 10/1950 | Clemson | 193/37 |
| 2,736,205 | 2/1956 | Dunne, Jr. | 193/37 |
| 3,198,411 | 8/1965 | Cope | 193/37 |
| 3,333,714 | 8/1967 | Sermet | 198/127 |

Primary Examiner—Andres H. Nielsen
Attorney—Newton, Hopkins & Ormsby

ABSTRACT: This invention relates to a conveyor roller for use in a logistic loading system for cargo aircraft and comprises two opposed extruded aluminum cup-shaped shells that are welded together along a common seam to provide a load bearing surface, each end having a central aperture for receiving therein an antifriction bearing member and a plurality of access apertures defined between said central aperture and said load bearing surface.

This invention further includes the method of manufacturing the conveyor roller designed for use in cargo aircraft, which method includes the steps of extruding cup-shaped shell members, punching apertures in the closed end of said shell members; welding two of said shell members together to form said roller; and anodizing the interior and exterior surfaces of said roller.

PATENTED FEB 2 1971

INVENTOR.
HUBERT G. LESLEY, DECEASED
BY KATHRYN W. LESLEY, EXECUTRIX

BY: Newton, Hopkins,
& Ormsby
Attorneys

PATENTED FEB 2 1971

INVENTOR.
HUBERT G. LESLEY, DECEASED
BY KATHRYN W. LESLEY, EXECUTRIX
BY Newton, Hopkins,
& Ormsby
Attorneys

CONVEYOR ROLLER AND METHOD OF MANUFACTURING SAME

BACKGROUND OF THE INVENTION

The extruded conveyor roller of the present invention is designed for use in a logistic loading system for cargo aircraft such as the United States Air Force C5A that is manufactured by Lockheed Aircraft of Marietta, Ga. The C5A aircraft is designed to utilize some 2,800 rollers of this type which are mounted in the flooring of the aircraft and will receive thereon pallets for carrying the cargo material that is to be transported.

The conveyor roller of the present invention is designed to carry a load in the neighborhood of 200 pounds per roller and it has been determined that the weight reduction achieved by the use of the roller of the present invention as contrasted to those of the prior art will result in a weight saving of approximately 150 pounds per aircraft which, when projected over the operational life of each aircraft, will realize a monetary saving of $30,000 per plane in operating costs.

The conveyor roller of the present invention further provides a lightweight, high strength embodiment which possesses strength characteristics that are increased some 50 percent over the conveyor rollers that were available in the prior art.

The conveyor roller of the present invention is structured so that the ratio of the length of the load bearing surface to the diameter of said load bearing surface is less than 2:1. By this arrangement the logistic flooring utilizes a far greater number of rollers thereby increasing the facility by which the cargo carrying pallets are maneuvered thereon while still achieving an overall weight reduction for the total rollers used per plane. In addition, there is achieved a greater distribution of load per roller.

PRIOR ART DEVICES

It should be noted that the conveyor rollers of the prior art utilized in logistic loading systems were fabricated from cylindrical sections of tubing that formed the load bearing surface, the ends of which were closed by machined sections that were press-fitted into the end of the tubing to complete the roller construction. These prior art rollers also utilized a load bearing surface whose length was in the neighborhood of four times the length of loading bearing surface of the present invention.

SUMMARY OF THE INVENTION

The present invention relates to a conveyor roller for use in a logistic loading system for cargo aircraft comprising two opposed extruded aluminum cup-shaped metal shells having substantially circular cross sections, each shell having a partially closed end, and said metal shells being integrally welded along a common seam to provide a load bearing surface between said partially closed ends, said load bearing surface being tapered from said partially closed ends toward the juncture of said shells so that the circular cross section of said roller is larger at said juncture than at said ends, each of said partially closed ends having an aligned central aperture for receiving therein an antifriction bearing member, said partially closed ends having a plurality of access apertures defined between said central aperture and said load bearing surface thereby providing access means to the interior of said roller and reducing the weight thereof, the wall thickness of said partially closed ends being larger adjacent said load bearing surface than adjacent said central aperture to increase its load bearing properties, the wall thickness of said load bearing surface being larger at each end than at the center thereof, and the interior and exterior metal surfaces being anodized.

The present invention also encompasses the method of manufacturing said roller that is designed for use in cargo aircraft and includes the steps of extruding cup-shaped shell members; punching apertures in the closed end of said shell members; welding two of said shell members together for forming said roller; and anodizing the interior and exterior surfaces of said roller.

These FIGS. and the following detailed description disclose illustrative embodiments of the invention; however, it is to be understood that the invention may be embodied in other equivalent forms.

DESCRIPTION OF ILLUSTRATIVE EMBODIMENT

Figure 1:
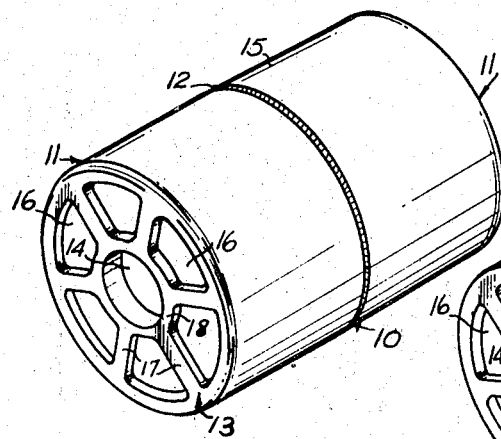
FIG. 1 is a perspective view of the conveyor roller of the present invention prior to the mounting therein of antifriction bearing members which are not shown.
Figure 2:
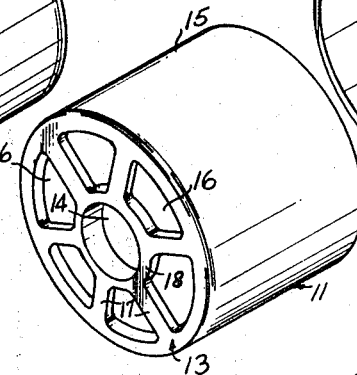
FIG. 2 is an exploded perspective view of the device shown in FIG. 1 showing the two extruded cup sections separated prior to their being welded together along common seam to form said conveyor roller.

Referring now in detail to the drawings, and in particular to FIGS. 1 through 4, it will be seen that the conveyor roller 10 of the present application includes two aluminum extruded cup-shaped shells 11 that are welded together along a common seam 12 as shown particularly in FIG. 1. The partially closed ends 13 include commonly aligned central apertures 14 that receive therein in fitted relationship antifriction bearing members B of a conventional type which are not shown. Between the partially closed end portions 13 there is defined a load bearing surface 15 which tapers slightly from each of said partially closed ends 13 outwardly toward said welded seam 12 so that the exterior circular cross section of the roller is larger at the juncture of the two cup-shaped shell portions than adjacent the partially closed ends thereof.

In each of the partially closed ends 13 there is defined between the central aperture 14 and the load bearing surface 15 a plurality of access apertures 16 which reduce the weight of the completed roller and provide access means to the interior thereof so that both the exterior and interior surface of the roller may be anodized. Between each adjacent access aperture 16 there is formed a strut or spoke member 17 that joins the hub 18 formed about the central aperture 14 with the load bearing surface 15 of the roller 10. It should be noted in FIG. 4 that the wall thickness of each of the struts 17 shown in that embodiment increases towards the load bearing surface 15 so that the wall thickness of the strut, which in effect is the partially closed end portion, is larger adjacent the load bearing surface 15 than adjacent the central aperture 14. This arrangement provides for increased strength properties of the wall of said roller that carries the antifriction bearing member.

Figure 4:
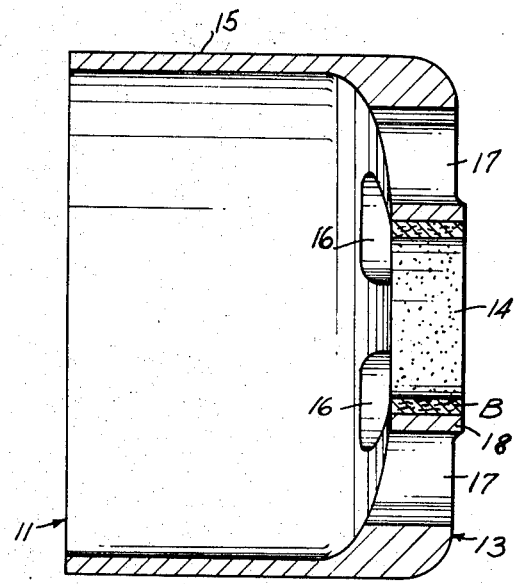
FIG. 4 is a cross-sectional view of the extruded cup section taken along lines 4—4 in FIG. 3.
Figure 3:
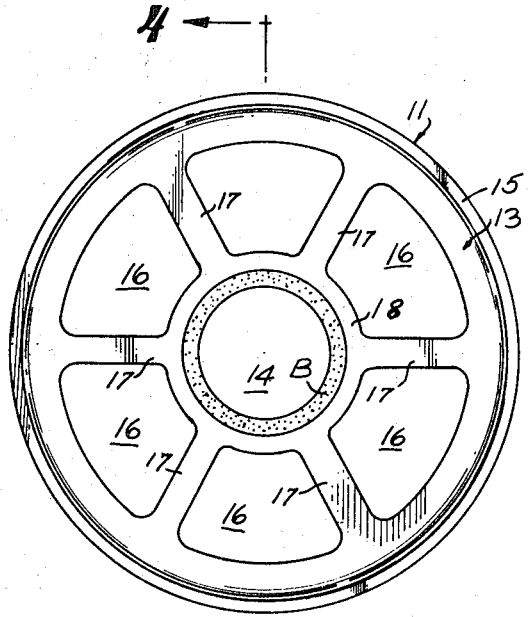
FIG. 3 is an end elevation showing the interior of the extruded cup section taken along the lines 3—3 of FIG. 2.

It should also be noted that in the embodiment shown in FIG. 4 that the wall thickness of the load bearing surface 15 is greater adjacent the partially closed end than at the center of the load bearing surface which is the common seam along which the two members are welded.

Figure 5:
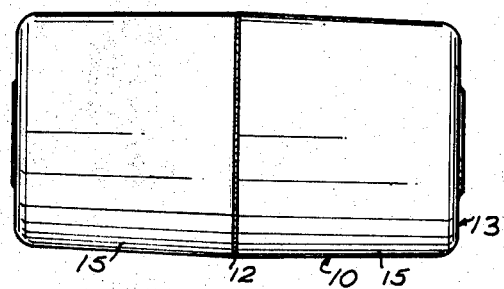
FIG. 5 is a front elevation view of the conveyor roller wherein the taper from the ends towards the center of the load bearing surface has been emphasized for the purposes of illustration.
Figure 6:
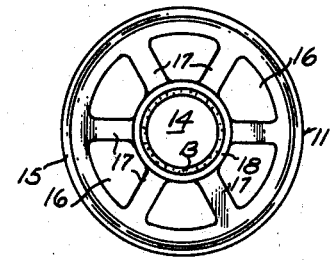
FIG. 6 is an end elevation of the exterior of the partially closed end of the extruded shell portion.

It should be noted in FIG. 5 that the circular configuration of the cup-shaped shell members 11 tapers outwardly from the partially closed end toward the seam 12 where the two shell members are welded together. The taper is .030 per inch and has been exaggerated for the purposes of illustration. The fact that the major diameter of the conveyor roller occurs at the center of the load bearing surface provides an arrangement whereby line contact is afforded to the cargo that is carried thereon rather than a surface contact which would result in difficulties in handling the cargo moved thereover due to increased friction.

Figure 7:
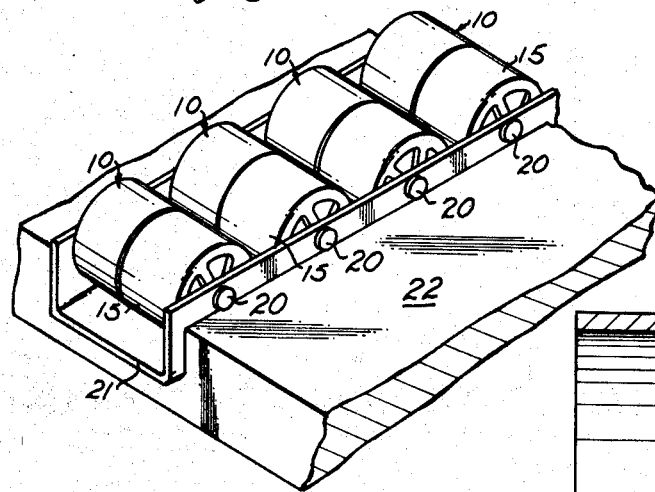
FIG. 7 is a perspective view showing a plurality of said rollers in their environmental surrounding, namely, in the flooring of a cargo carrying aircraft.
Figure 8:
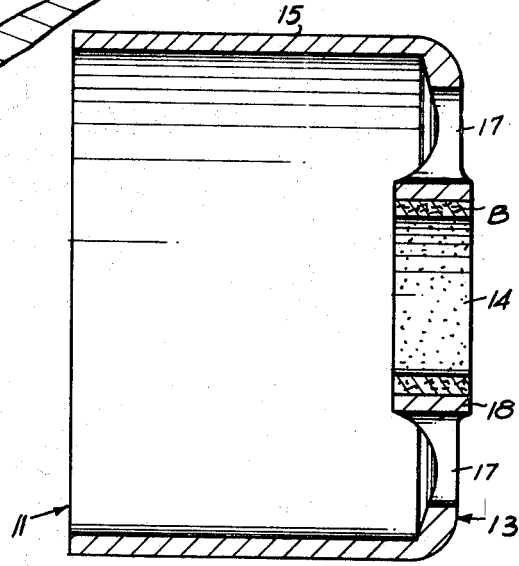
FIG. 8 is a cross-sectional view of an extruded cup section showing an alternate embodiment of the partially closed end wall configuration.
Figure 9:
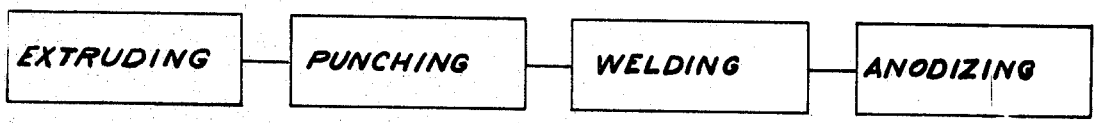
FIG. 9 is a flow chart showing the various steps of fabrication that are included in the present invention.

FIG. 7 illustrates the environmental use in which the conveyor roller of the present application is utilized. It can be seen that a plurality of rollers 10 are mounted on a plurality of axles 20 that extend between the upstanding sides of channel 21 thereby positioning the load bearing surface 15 of each roller above the floor level 22 of the cargo aircraft.

It should further be noted that the length of load bearing surface in the illustrative embodiment is approximately 1.8 inches and that the diameter of the load bearing surface is approximately 1.7 inches which produces a ratio of less than 2:1. By this arrangement a greater number of rollers are utilized per square foot area of flooring thus increasing the maneuverability factor for loading the cargo thereon.

METHOD OF MANUFACTURE

The method of producing the conveyor roller of the present invention includes the steps of forming circular discs out of flat aluminum stock or other like high strength, light metals and subjecting said disc members to an impact extrusion process such as a backward extrusion wherein the punch strikes the slug or disc member in the die cavity causing the metal to flow in the opposite direction of the punch stroke, the shape of the resulting cup section being determined by the cooperative shape of the punch and die. This produces a cup-shaped member having a closed end. These cup-shaped members are then subjected to a multiple punch operation, the first punching operation forming the central aperture 14 and the subsequent punching operation forming the access apertures 16 that are defined between the central aperture 14 and the load bearing surface 15. A multidrill operation may be utilized in lieu of the punching operation to form said apertures. The cup-shaped members having the apertures formed in the partially closed ends are then welded together along a common seam 12 by flash or electron beam-type welding. The welded seam provides an increased strength property at the particular area on which the load is received. The exterior and interior surfaces of the roller are then subjected to an anodizing process. It should be noted that the access apertures provide means whereby the anodizing solution may be completely drained from the interior of the roller.

It will be obvious to those skilled in the art that many variations may be made in the embodiments chosen for the purposes of illustrating the present invention without departing from the scope thereof as defined by the appended claims.

I claim:

1. A roller comprising two cup-shaped extruded metal shells having substantially circular cross sections each shell having a partially closed end comprising a central aperture for receiving a bearing member and radial spokes extending from said aperture to the outer wall of the shell, the said shells being welded together on a seam midway between the closed ends to provide a bearing, the shells being so shaped as to taper from the welded area toward each end.

2. A roller as in claim 1 wherein the metal of the shells increases in thickness from the welded area toward each end portion.

3. A roller as in claim 2 wherein the thickness of the spoke portions increases from the central apertures toward the load bearing surfaces.

4. A roller as in claim 2 which is anodized on both its inner and outer surfaces, the draining of the anodizing solution from the interior being permitted by the spaces between the spokes.

5. A roller as in claim 4 wherein the shells are formed of aluminum.

6. A roller as in claim 5 having a length substantially less than twice its greatest diameter.

7. A logistic loading system for cargo aircraft comprising a series of rollers mounted adjacent each other on parallel axes to provide a surface over which cargo may be moved, each roller comprising two cup-shaped extruded shells of light metal having substantially circular cross section, each shell having a partially closed end including a central aperture for receiving a bearing and radial spokes extending from the aperture to the outer wall of the shell, said spokes increasing in thickness from the aperture outwardly, said shells tapering from the welded area toward the ends and the metal of the shells increasing in thickness from the welded area towards the ends.

8. A logistic loading system as in claim 7 in which the shells are formed of aluminum.

9. A logistic loading system as in claim 7 in which both the inner and outer surfaces of the rollers are anodized.